(12) United States Patent
Kano

(10) Patent No.: US 9,065,989 B2
(45) Date of Patent: Jun. 23, 2015

(54) IMAGE PICKUP APPARATUS HAVING IMAGE PICKUP DEVICE

(71) Applicant: CANON KABUSHIKI KAISHA, Tokyo (JP)

(72) Inventor: Takahiko Kano, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 13 days.

(21) Appl. No.: 13/834,093

(22) Filed: Mar. 15, 2013

(65) Prior Publication Data

US 2013/0286281 A1  Oct. 31, 2013

(30) Foreign Application Priority Data

Apr. 27, 2012 (JP) ................................. 2012-102873

(51) Int. Cl.
*H04N 5/225* (2006.01)

(52) U.S. Cl.
CPC ........... *H04N 5/2251* (2013.01); *H04N 5/2253* (2013.01)

(58) Field of Classification Search
None
See application file for complete search history.

(56) References Cited

U.S. PATENT DOCUMENTS

| | | | | |
|---|---|---|---|---|
| 6,147,389 | A * | 11/2000 | Stern et al. | 257/434 |
| 6,734,419 | B1 * | 5/2004 | Glenn et al. | 250/239 |
| 7,274,094 | B2 * | 9/2007 | Boon et al. | 257/680 |
| 7,663,694 | B2 | 2/2010 | Kurosawa | |
| 2005/0083590 | A1 * | 4/2005 | Tanigawa et al. | 359/819 |
| 2007/0195187 | A1 * | 8/2007 | Tagata et al. | 348/340 |
| 2010/0045832 | A1 * | 2/2010 | Mochiduki | 348/294 |
| 2011/0304919 | A1 * | 12/2011 | Fujinaka et al. | 359/601 |
| 2012/0050609 | A1 * | 3/2012 | Ji et al. | 348/374 |

FOREIGN PATENT DOCUMENTS

JP  4225860 B2  2/2009

* cited by examiner

*Primary Examiner* — Jason Flohre
(74) *Attorney, Agent, or Firm* — Rossi, Kimms & McDowell LLP

(57) ABSTRACT

An image pickup apparatus which is capable of fixing an image pickup device compactly and with high strength. A wiring substrate has an image pickup device mounted thereon. A fixing member is fixed on the image pickup device. The fixing member is provided with an abutment surface that comes into abutment with the image pickup device, an opening from which a light-incident surface of the image pickup device is exposed, and a wall portion that faces a side surface of the image pickup device. An adhesive is filled in a space formed between the side surface of the image pickup device and the wall portion.

5 Claims, 12 Drawing Sheets

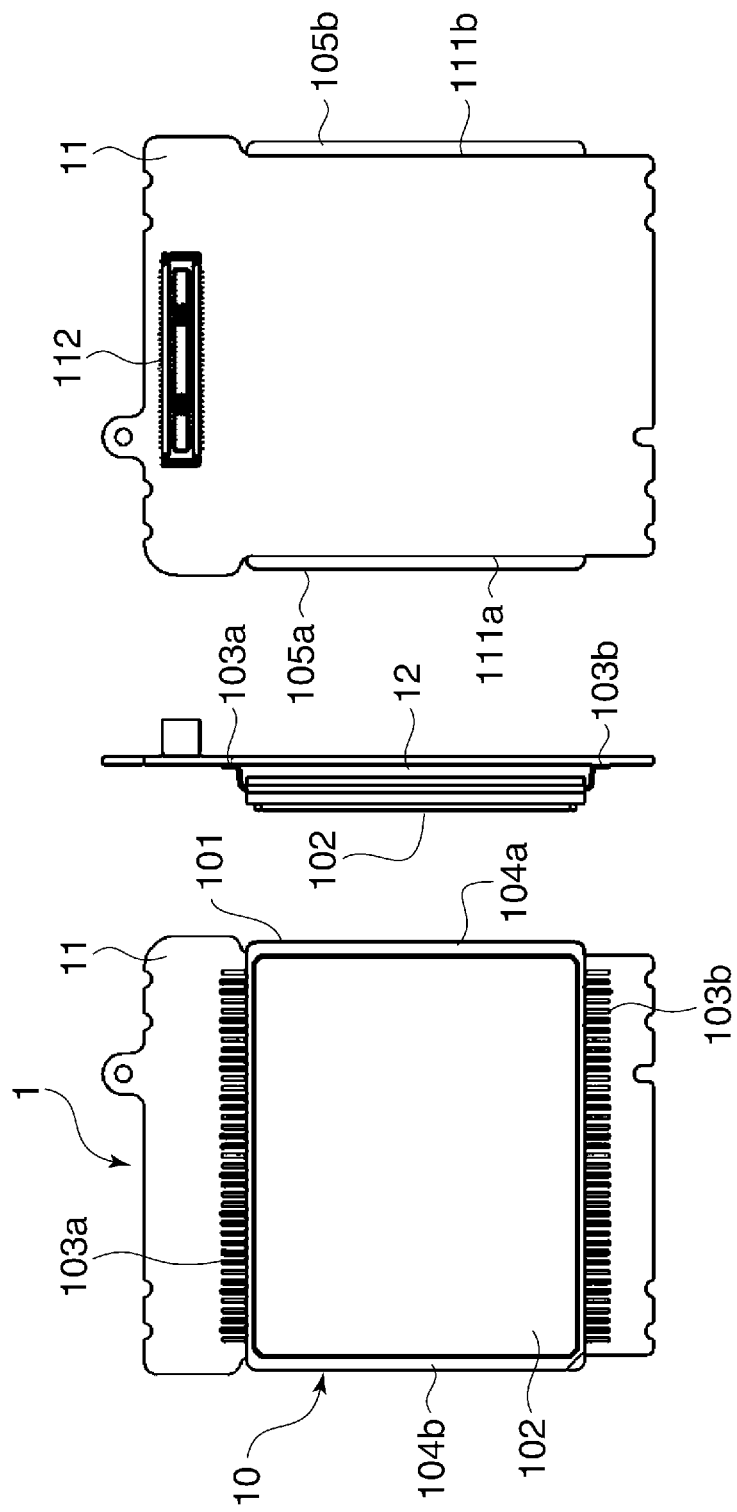

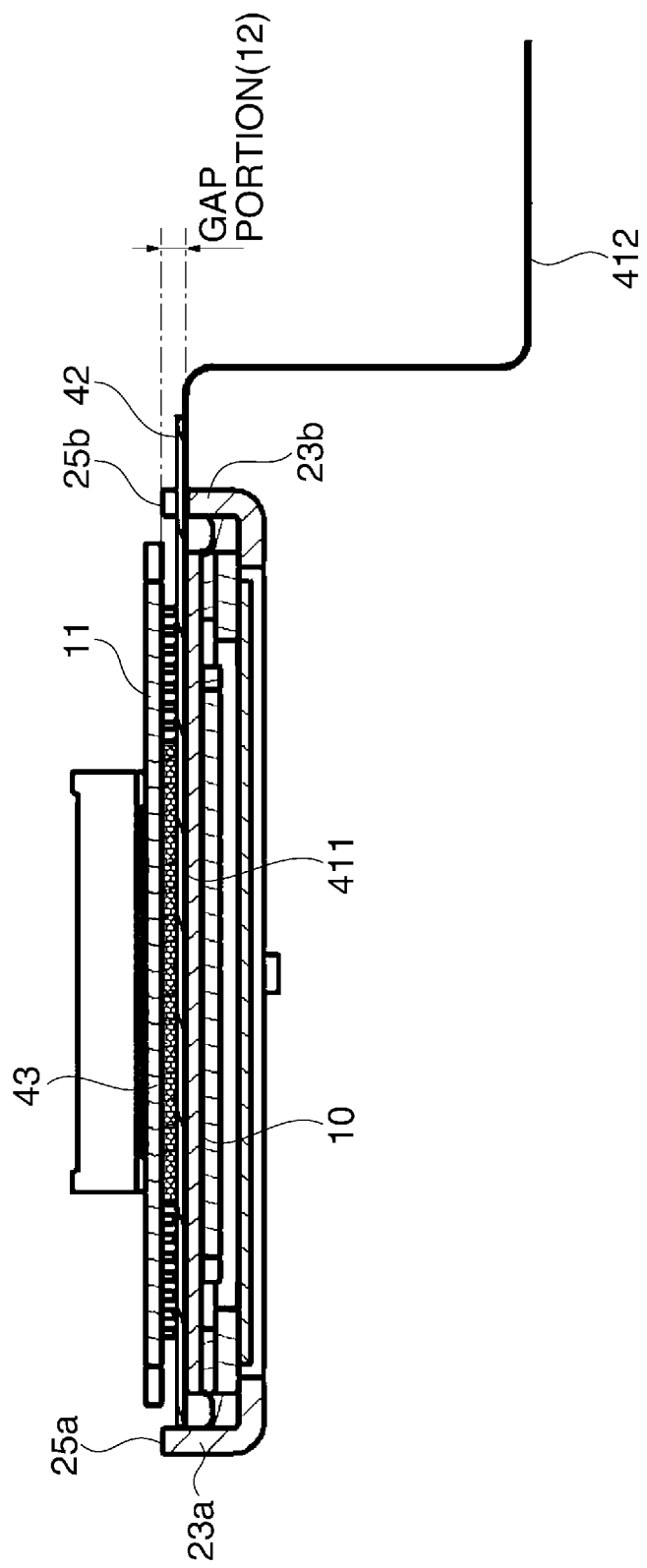

IMAGE PICKUP APPARATUS HAVING IMAGE PICKUP DEVICE

BACKGROUND OF THE INVENTION

1. Field of the Invention

The present invention relates to an image pickup apparatus having an image pickup device.

2. Description of the Related Art

For digital single-reflex cameras, there is known an image pickup device holding method that extends a plate-like mounting portion from a part of a package member of the image pickup device and fastens the mounting portion to a sheet-metal member, which is disposed in an image pickup device main body, by screws or the like. However, the holding method using screws for fastening has a problem that a space for mounting of screws is required, resulting in upsizing of an image pickup apparatus.

Accordingly, there is known a method in which in an image pickup apparatus main body, a holding metal sheet having an opening for bonding is disposed in opposed relation to a rear surface of an image pickup device, and the image pickup device is fixed to the holding metal sheet by coating the opening with an adhesive with the rear surface of the image pickup device and the holding metal sheet closely attached to each other (see Japanese Patent Publication No. 4225860). According to this method, a space for mounting of screws required in the case of fastening using screws as described above can be dispensed with, and hence an image pickup device can be downsized.

In recent years, in order to increase productivity of an image pickup device and an image pickup device substrate on which the image pickup device is to be mounted, development of a technique to automatically mount the image pickup device on the image pickup device substrate using an automatic machine has been promoted. In this case, a rear surface of the image pickup device is covered with the image pickup device substrate, and hence the above method for fixing the image pickup device as described in Japanese Patent Publication No. 4225860 cannot be used.

Moreover, from the viewpoint of product quality, image pickup apparatuses are required to be firmly constructed so as not to be broken or not to have any troubles with imaging functions even when subjected to shock due to a drop of electronic equipment or the like. Accordingly, a rigid holding structure capable of keeping the position of an image pickup device even when subjected to shock is required. In particular, for digital single-reflex cameras, a large and heavy image pickup device disadvantageous to shock resistance is used, and it is thus necessary to firmly hold the image pickup device.

SUMMARY OF THE INVENTION

The present invention provides an image pickup apparatus capable of fixing an image pickup device compactly and with high strength.

Accordingly, a first aspect of the present invention provides an image pickup apparatus comprising an image pickup device, a wiring substrate configured to have the image pickup device mounted thereon, a fixing member configured to be fixed on the image pickup device, the fixing member being provided with an abutment surface that comes into abutment with the image pickup device, an opening from which a light-incident surface of the image pickup device is exposed, and an wall portion that faces a side surface of the image pickup device, and an adhesive configured to be filled in a space formed between the side surface of the image pickup device and the wall portion.

According to the present invention, the image pickup device can be fixed to the fixing member compactly and with high strength.

Further features of the present invention will become apparent from the following description of exemplary embodiments (with reference to the attached drawings).

BRIEF DESCRIPTION OF THE DRAWINGS

FIGS. 1A, 1B, and 1C are a front view, a right side view, and a rear view, respectively, showing an image pickup device unit which an image pickup apparatus according to an embodiment of the present invention has.

FIG. 12 is a cross-sectional view taken in the direction of an arrow V-V in FIG. 11.

DESCRIPTION OF THE EMBODIMENTS

Figure 2A:
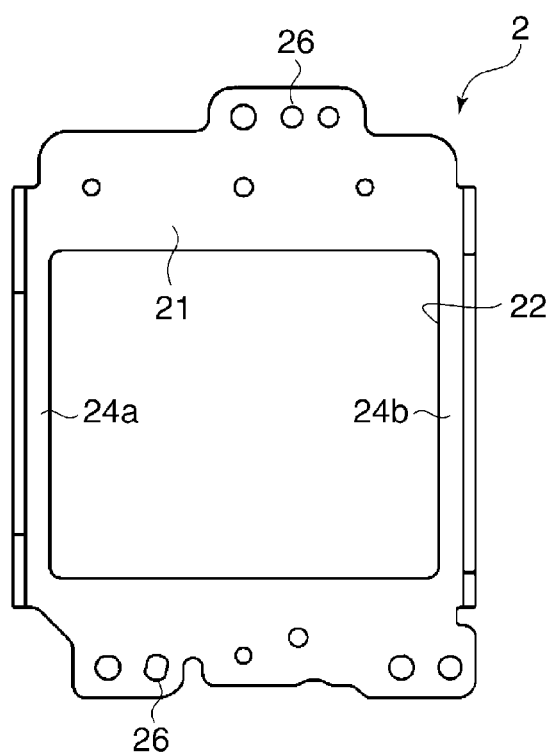
FIGS. 2A, 2B, and 2C are a rear view, a bottom view, and a rear perspective view, respectively, showing a construction of a plate fixed to the image pickup device unit and mounted on a main body of the image pickup apparatus according to the present embodiment.

The present invention will now be described in detail with reference to the drawings showing an embodiment thereof. Here, a construction in which an image pickup device is automatically mounted on a wiring substrate (hereafter referred to as "the substrate"), and an image pickup device unit which is the image pickup device and the substrate combined in one unit is fixed to a fixing member is taken up.

FIGS. 1A, 1B, and 1C are views schematically showing a construction of an image pickup device unit 1 which an image pickup apparatus according to the present embodiment has, in which FIG. 1A is a front view, FIG. 1B is a right side view (a view of FIG. 1A as viewed from a right side), and FIG. 1C is a rear view. The image pickup device unit 1 is constructed by automatically mounting an image pickup device 10 on a wiring substrate 11 (hereafter referred to as "the substrate 11") and combining them in one unit.

The image pickup device 10 has a photoelectric converter (not shown) therein and converts an optical image, which is obtained through an optical system member (not shown) which the image pickup apparatus has, into an electric signal. A package 101, which is a housing forming an appearance of the image pickup device 10, holds component elements such as the photoelectric converter inside the image pickup device 10, and a surface of the package 101 on a front side is covered with a cover glass 102.

Leads 103a and 103b, which are provided on a pair of opposing sides (in the present embodiment, long sides) of the package 101, are electrically connected to the photoelectric converter inside the image pickup device 10. Package side surfaces 105a and 105b which are side surfaces of the package 101 on the other pair of opposing sides thereof are exposed. Areas between side surfaces of the cover glass 102, which are substantially parallel to the package side surfaces 105a and 105b, and the package side surfaces 105a and 105b are package-side abutment surfaces 104a and 104b which are in abutment with a plate 2 (to be described later with reference to FIGS. 2A to 2C).

The substrate 11, which is electrically connected to the photoelectric converter of the image pickup device 10 via the leads 103a and 104a, receives an electric signal from the image pickup device 10. A substrate connector 112, which is electrically connected to an image pickup apparatus main body, is disposed on a rear side of the substrate 11. A gap portion (stand-off) 12 is provided between a rear surface of the image pickup device 10 and a surface of the substrate 11.

Although the overall arrangement of the image pickup apparatus is not shown, an optical system member comprised of an optical lens and others is disposed ahead of a front side of the image pickup device unit 1 in the image pickup apparatus. An optical image input to the image pickup device unit 1 via the optical system member is formed on the photoelectric converter inside the image pickup device 10 through the glass cover 102 which is transparent.

The photoelectric converter of the image pickup device 10 is comprised of, for example, a photodiode which detects light to generate electrical charge. Concrete examples of the image pickup device 10 include a CCD sensor and a CMOS sensor. The image pickup device 10 is of a CER-DIP type in which the leads 103a and 103b are sandwiched by ceramic plates to construct the package 101, the leads 103a and 103b are soldered to the substrate 11 on the outside of the package 101, and the gap portion 12 is formed between a rear surface of the package 101 and the surface of the substrate 11. The image pickup device 10, however, is not limited to this construction. For example, an image pickup device of an LLCC (leadless chip carrier) type in which an electrode pad is provided on a rear surface of a package, and there are no leads outside the package may be used.

The leads 103a and 103b are electrically connected to a land area (not shown) of the substrate 11 through soldering by automatic mounting, and as a result, the image pickup device 10 is mechanically integrated with the substrate 11. It should be noted that the substrate 11 may also be a flexible substrate such as a flexible cable (FPC).

The cover glass 102 is bonded and fixed to the package 101 while being laid over a surface of the package 101, and as shown in FIG. 1B, the cover glass 102 projects from the surface of the package 101 toward front. As shown in FIG. 1C, in a part of the substrate 11 on which the package 101 is mounted, the width between substrate ends 111a and 111b, which are substantially parallel to the package side surfaces 105a and 105b, is equal to or smaller than the width between the package side surfaces 105a and 105b. For this reason, when the image pickup device unit 1 is viewed from its rear side, the package side surfaces 105a and 105b are exposed.

It should be noted that although in the present embodiment, the entire package side surfaces 105a and 105b externally project from the substrate ends 111a and 111b and expose themselves as described above, this is not limitative, but the shape of the substrate 11 may be designed such that the package side surfaces 105a and 105b partially project from the substrate ends 111a and 111b of the substrate 11 and expose themselves.

An analog electric signal output from the photoelectric converter inside the image pickup device 10 is transmitted to the substrate 11 via the leads 103a and 103b. The analog electric signal is transmitted to a main substrate disposed on the image pickup apparatus main body, not shown, via the substrate connector 112 of the substrate 11. A control circuit provided on the main substrate converts the analog electric signal into a digital signal and then carries out predetermined processing such as compression and recording.

Figure 2C:
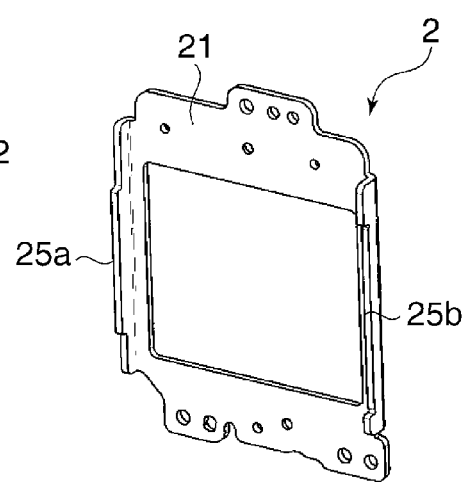
Figure 2B:
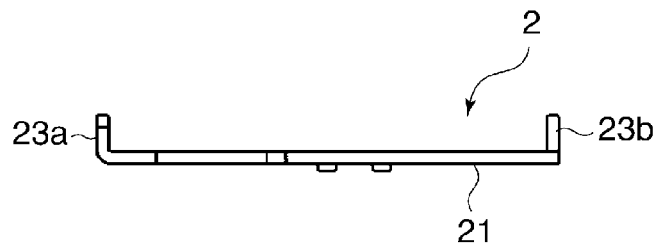

FIGS. 2A, 2B, and 2C are views showing a construction of the plate 2 which is an exemplary fixing member on which the image pickup device unit 1 is positioned and fixed, in which FIG. 2A is a rear view, FIG. 2B is a bottom view, and FIG. 2C is a rear perspective view. It should be noted that in the present embodiment, as for the plate 2, a horizontal direction as viewed in FIG. 2A is defined as "the width direction".

The plate 2 is, for example, a sheet-metal member produced by stamping of metal such as stainless steel. An opening 22 that passes through a front side and a rear side of a flat portion 21 of the plate 2 and a pair of positioning holes 26 for positioning the plate 2 with respect to the image pickup apparatus main body, not shown, are formed in the flat portion 21 of the plate 2. As will be described later, the opening 22 is provided so as to expose a light-incident surface of the image pickup device 10 with the image pickup device unit 1 disposed on the plate 2. In the present embodiment, the pair of positioning holes 26 is comprised of a round hole and an elongate hole, but the pair of positioning holes 26 is not limited to such shapes. The pair of positioning holes 26 and positioning bosses (not shown) of the image pickup apparatus main body are engaged with each other to position the plate 2 with respect to the image pickup apparatus main body and fix the same.

A pair of wall portions 23a and 23b are formed in the rear side of the plate 2 and on a pair of sides of the plate 2 which face each other across the opening 22 in the width direction in the plate 2. In the flat portion 21, an area between the opening 22 and the wall portion 23a is a plate-side abutment surface 24a that comes into abutment with a package-side abutment surface 104a when the image pickup device unit 1 is positioned and fixed on the plate 2. Likewise, an area between the opening 22 and the wall portion 23b in the flat portion 21 is a plate-side abutment surface 24b that comes into abutment with a package-side abutment surface 104b when the image pickup device unit 1 is positioned and fixed on the plate 2.

To incorporate an image pickup device plate unit, which is constructed by fixing the image pickup device unit 1 to the plate 2, into a thermally-conductive sheet unit 4 (see FIGS. 9A and 9B), a convex portion 25a is formed at an end of the wall portion 23a, and a concave portion 25b is formed at an end of the wall portion 23b. Functions of the convex portion 25a and the concave portion 25b will be described later in detail.

Figure 3:
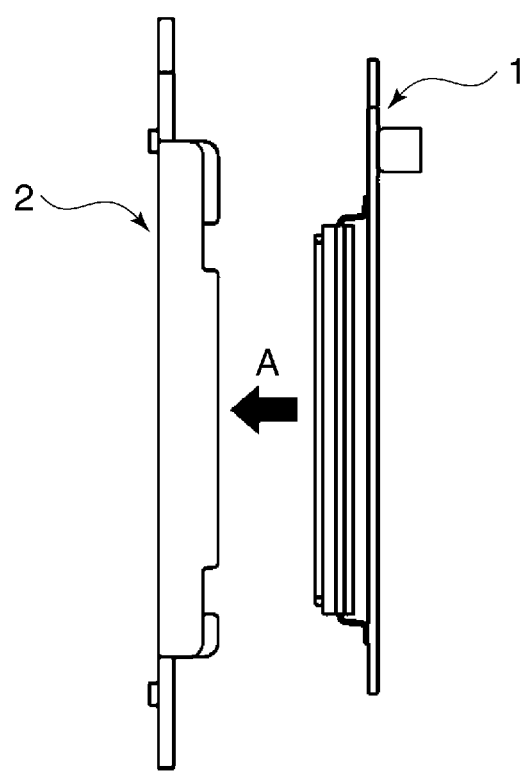
FIG. 3 is a side view showing how the image pickup device unit is positioned with respect to the plate.

FIG. 3 is a side view showing how the image pickup device unit 1 is positioned with respect to the plate 2, and as with FIG. 1B, FIG. 3 is a right side view of the image pickup device unit 1. As shown in FIG. 3, the image pickup device unit 1 is disposed with respect to the plate 2 in a direction indicated by an arrow A from a rear side of the plate 2 such that the image pickup device 10 is housed in an area sandwiched between the wall portions 23a and 23b. Accordingly, in the image pickup device 10, the width between the package side surfaces 105a and 105b that are two sides of the image pickup device 10 which are opposed to the wall portions 23a and 23b is smaller than the width between the wall portions 23a and 23b.

Figure 4A:
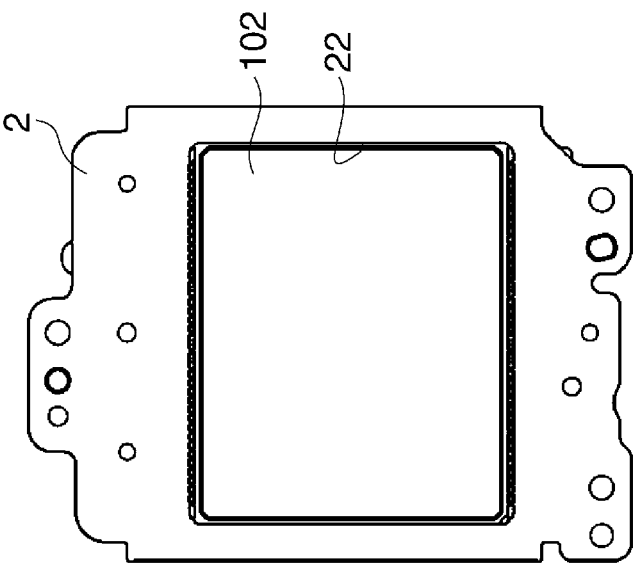
FIGS. 4A, 4B, and 4C are a front view, a right side view, and a rear view, respectively, showing a state after the image pickup device unit is positioned with respect to the plate.
Figure 4B:
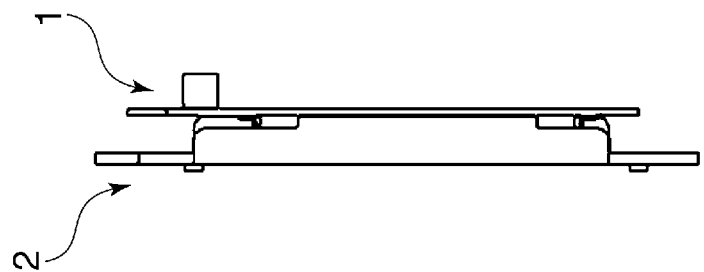
Figure 4C:
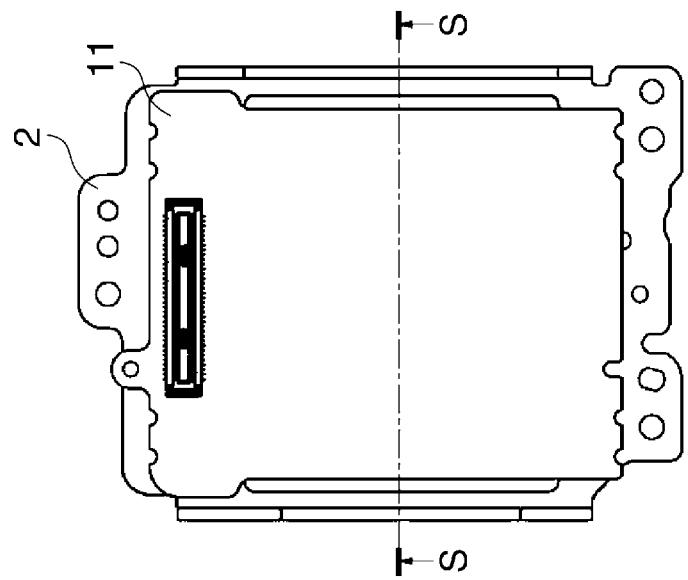

FIGS. 4A, 4B, and 4C are views showing a state after the image pickup device unit 1 is disposed with respect to the plate 2 according to the positioning and fixing procedure shown in FIG. 3, in which FIG. 4A is a front view, FIG. 4B is a right side view (a view of FIG. 4A as viewed from a right side), and FIG. 4C is a rear view.

As shown in FIG. 4A, the image pickup device 10 is incorporated into the plate 2 such that the cover glass 102 projecting from the surface of the package 101 fits into the opening 22 of the plate 22. At this time, the position of the image pickup device unit 1 is adjusted so that the center of the photoelectric converter inside the image pickup device 10 can be at an ideal position in terms of design, and description thereof will be given later. Then, as described earlier, the plate 2 is incorporated into a predetermined place of the image pickup apparatus main body, and as a result, the image pickup device unit 1 as well can be positioned at an ideal position with respect to the image pickup apparatus main body.

Figure 5:
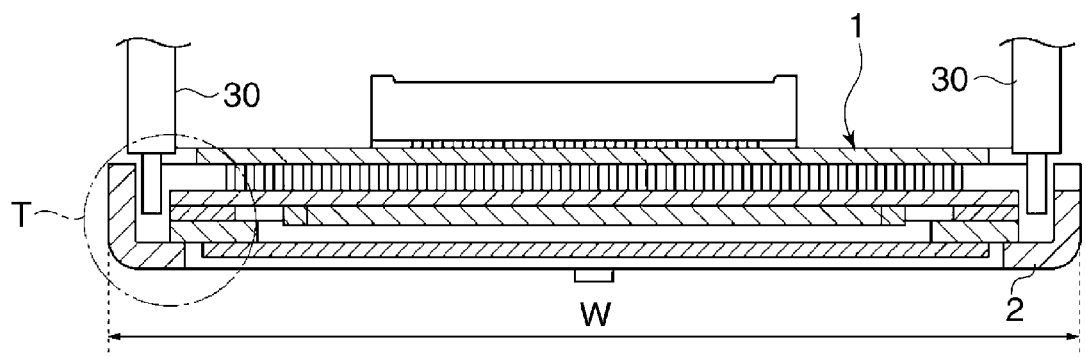
FIG. 5 is a cross-sectional view taken in the direction of an arrow S-S in FIG. 4C.

FIG. 5 is a cross-sectional view taken in the direction of an arrow S-S in FIG. 4C and showing a state before the image pickup device unit 1 is incorporated into the plate 2 and then bonded and fixed to the plate 2 by an adhesive. The adhesive for bonding the image pickup device unit 1 to the plate 2 is packed in a dispenser 30 and ejected from an ejecting portion 31 (see FIG. 6) at an end of the dispenser 30. In the present embodiment, a light curing resin such as an ultraviolet curing resin is used as the adhesive. This is because the adhesive can be cured in a short time by using a light curing resin, and as a result, the time required for bonding and fixing can be reduced, bringing about an improvement in production efficiency.

The dispenser 30 is inserted from the rear side of the image pickup device unit 1 into spaces between the package side surfaces 105a and 105b of the image pickup device unit 1 and the wall portions 23a and 23b of the plate 2. At this time, the distance between the substrate ends 111a and 11b of the substrate 11 is shorter than the distance between the package side surfaces 105a and 105b of the package 101. Namely, the distance from the wall portion 23a to the substrate end 111a of the substrate 11 which is opposed to the wall portion 23a is shorter than the distance from the wall portion 23a to the package side surfaces 105a and 105a of the image pickup device unit 1. For this reason, the substrate 11 does not interfere with the insertion of the dispenser 30, and hence the dispenser 30 can be easily inserted into a predetermined place.

Thus, in the present embodiment, even the image pickup device unit 1 in which the image pickup device 10 is automatically mounted on the substrate 11 can be bonded and fixed to the plate 2 while conserving space. Moreover, when a light curing resin is used as the adhesive, the adhesive needs to be irradiated with light after coating, but the package side surfaces 105a and 105b are exposed in rear view, and hence the coated adhesive can be easily irradiated with light from the rear side. It should be noted that although in the present embodiment, the shape of the substrate 11 is designed such that the entire package side surfaces 105a and 105b are exposed, the substrate 11 may be shaped such that the package side surfaces 105a and 105b may be partially exposed.

A width W in FIG. 5 represents the maximum width of the plate 2 in the width direction. A description of this width W will be given later together with a later description referring to FIG. 6.

Figure 6:
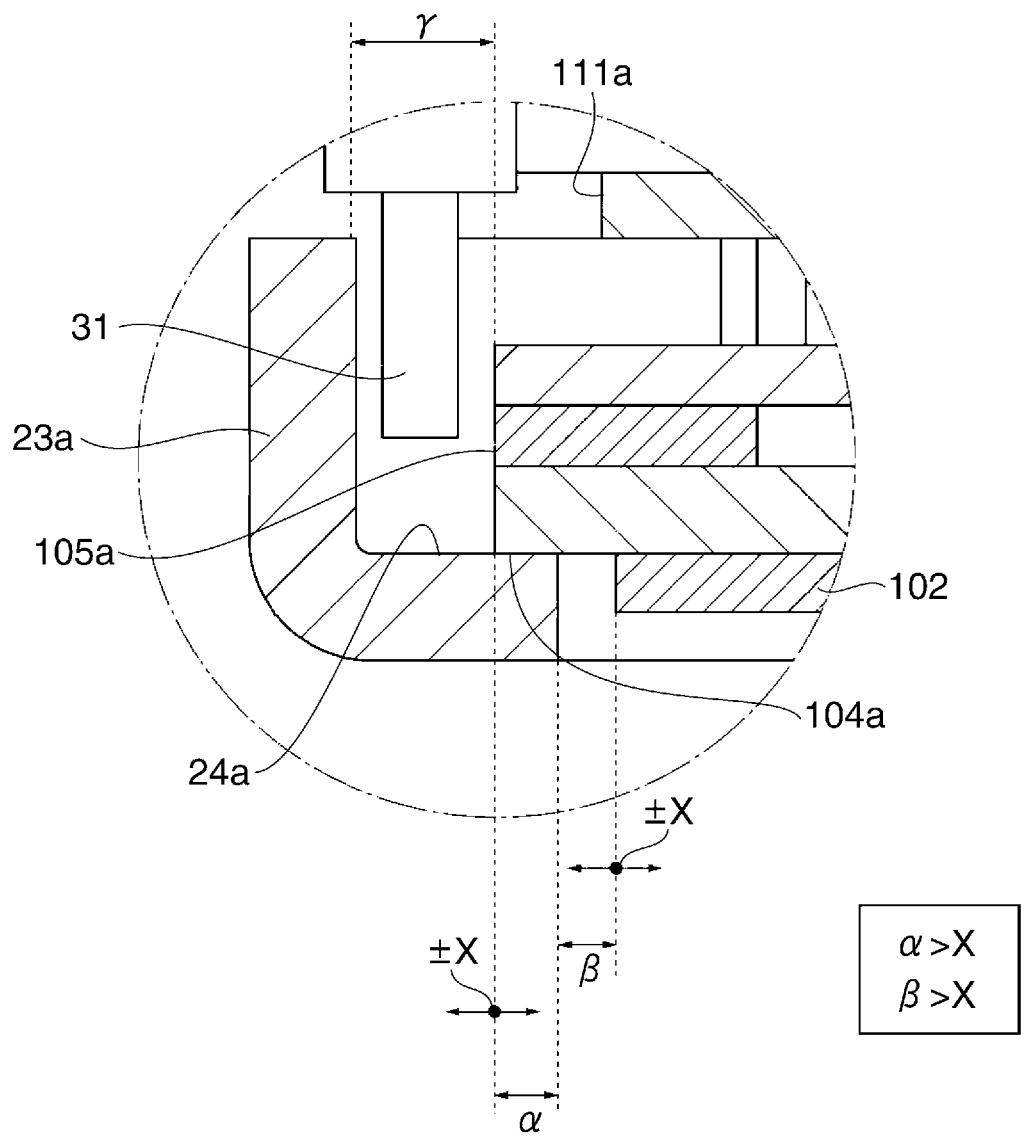
FIG. 6 is an enlarged view of a T area appearing in FIG. 5.

FIG. 6 is an enlarged view of a T area appearing in FIG. 5. With the image pickup unit 1 incorporated in the plate 2, the package-side abutment surface 104a sits on the plate-side abutment surface 24a, and the plate-side abutment surface 24a and the package-side abutment surface 104a are closely attached to each other. A dimension $\beta$ in FIG. 6 represents a clearance formed between an end face of the cover glass 102 and a side of the opening 22 with the image pickup unit 1 incorporated in the plate 2. A dimension $\alpha$ in FIG. 6 represents the amount of overlap between the plate-side abutment surface 24a and the package-side abutment surface 104a. When the image pickup unit 1 is incorporated into the plate 2, the image pickup unit 1 comes into abutment with the plate 2 in an area with the dimension $\alpha$, and as a result, relative positions of the image pickup unit 1 and the plate 2 in the mounting direction (the direction indicated by the arrow A in FIG. 3) are determined.

The ejecting portion 31 at the tip (needle tip) of the dispenser 30 gets between the package side surface 105a and the wall portion 23a to eject the adhesive. A dimension $\gamma$ in FIG. 6 represents a width dimension of a gap portion between the package side surface 105a and the wall portion 23a.

As described above, the clearance with the dimension $\beta$ is formed between the end face of the cover glass 102 and the side of the opening 22 in the width direction of the plate 2.

It is necessary to position the image pickup device unit 1 with respect to the plate 2 such that the center of the photoelectric converter inside the image pickup device 10 can be at an ideal position with respect to the plate 2. Thus, a description will now be given of an adjustment range ±X (variation range) within which the position of the image pickup device unit 1 is adjusted with respect to the plate 2 in the width direction of the plate 2.

The dimension $\alpha$ needs to be set such that the package-side abutment surface 104a sits on the plate-side abutment surface 24a when the position of the image pickup device unit 1 is adjusted with respect to the plate 2. Namely, the relationship "$\alpha$>X" needs to be satisfied. Moreover, the dimension $\beta$ needs to be set such that the end face of the cover glass 102 and the side of the opening 22 do not interfere (conflict) with each other on the assumption that the relationship "$\alpha$>X" is satisfied. Thus, the relationship "$\beta$>X" needs to be satisfied. The dimension $\gamma$ needs to be surely longer than a diameter (width) of the ejecting portion 31 of the dispenser 30 even when the position of the image pickup device unit 1 with respect to the plate 2 varies.

By setting the dimensions $\alpha$, $\beta$, and $\gamma$ at numeric values satisfying the above conditions and tailored to downsizing, the image pickup device unit 1 can be reduced in size in the width direction as compared to, for example, a case where a plate-like mounting portion is extended from part of a package to fasten an image pickup device by screws as in the prior art. Namely, by setting the dimensions $\alpha$, $\beta$, and $\gamma$ at the minimum values based on the adjustment range ±X, the width W of the plate 2 set at the minimum value can be applied to the image pickup apparatus, and as a result, the image pickup apparatus can be downsized.

As shown in FIG. 6, a space filled with the adhesive (a space ahead of the tip of the ejecting portion 31) is a sac-like (groove-like) space surrounded on three sides by the package side surface 105a, the plate-side abutment surface 24a, and the wall portion 23a. Thus, by forming the space filled with the adhesive as the sac-like space, the adhesive can be prevented from flowing out in the width direction of the plate 2. This effect is more significant in a case where the space is filled with the adhesive while the image pickup device unit 1 is being urged against the plate 2 with a predetermined force.

It should be noted that as a method to bond the image pickup device unit 1 and the plate 2 together, there seems to be a method in which the image pickup device unit 1 is bonded to the plate 2 while the image pickup device unit 1 is held in a state of being positioned with respect to the plate 2 in the mounting direction using a positioning jig. According to this method, however, workability is not good. On the other hand, the method that bonds the plate-side abutment surface 24a and the package-side abutment surface 104a together while holding them in close contact with each other is excellent in workability, and hence mistakes at work during a bonding process can be minimized.

Figure 7:
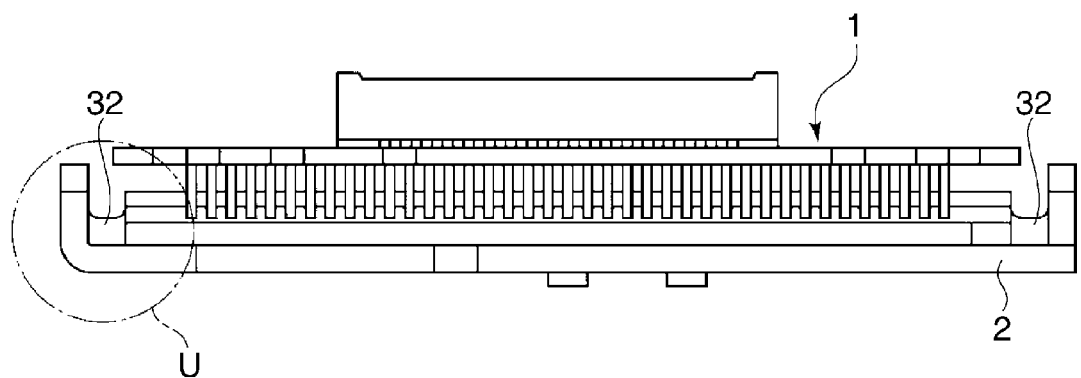
FIG. 7 is a bottom view showing a state in which the image pickup device unit and the plate are bonded and fixed to each other by an adhesive.

FIG. 7 is a bottom view showing a state in which the image pickup device unit 1 and the plate 2 are bonded and fixed to each other by the adhesive. It should be noted that in the following description, a unit obtained by combining the image pickup device unit 1 and the plate 2 in one by bonding and fixing will be referred to as "the image pickup device plate unit".

In the present embodiment, on two surfaces of the plate 2 in the width direction in which the ejecting portion 31 of the dispenser 30 is inserted (see FIG. 5), the image pickup device unit 1 and the plate 2 are bonded together by the adhesive 32. Specifically, in the state shown in FIG. 5, the dispenser 30 is moved along the package side surface 105a while the adhesive 32 is being ejected, and thereafter, the ejected adhesive 32 is cured. At this time, by changing the position and the moving range of the dispenser 30, the ejecting position and the ejecting range of the adhesive 32 can be changed. Namely, the ejecting position and the ejecting range of the adhesive 32 can be set as appropriate. Therefore, for example, with the package side surface 105a partially projecting and exposed from the substrate end 111a of the substrate 11, the adhesive 32 can be packed in only an exposed portion of the package side surface 105a and cured.

Figure 8:
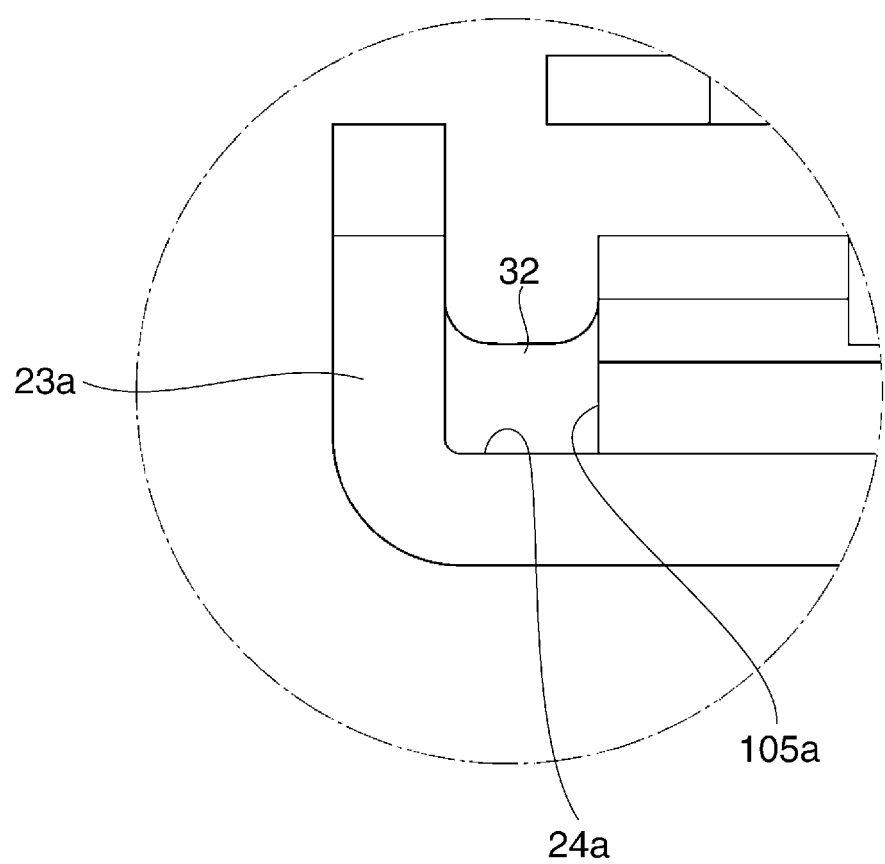
FIG. 8 is an enlarged view of a U area appearing in FIG. 7.

FIG. 8 is an enlarged view of a U area appearing in FIG. 7. The image pickup device unit 1 and the plate 2 are bonded and fixed to each other by the adhesive 32 being packed and hardened in the sac-like space surrounded on three sides by the package side surface 105a, the plate-side abutment surface 24a, and the wall portion 23a. Because the plate 2 is thus provided with the wall portion 23a, bonding on three surfaces consisting of the package side surface 105a, the plate-side abutment surface 24a, and the wall portion 23a is possible.

As a result, bonding strength can be improved as compared to, for example, a case of bonding on two surfaces consisting of the package side surface 105a and the plate-side abutment surface 24a. Moreover, because the package side surface 105a and the wall portion 23a of the high-strength plate 2 are combined in one unit by the adhesive 32, mechanical strength of the image pickup device plate unit as a whole can be improved, and resistance to shock can be increased. It should be noted that the same holds for the package side surface 105b (on the wall portion 23b side).

As described above, according to the present embodiment, the downsized image pickup device plate unit can be disposed with respect to the image pickup apparatus main body. Also, the strength at which the image pickup device unit 1 and the plate 2 are bonded together can be improved, and also, mechanical strength and shock resistance of the image pickup device plate unit as a whole can be increased.

Figure 9B:
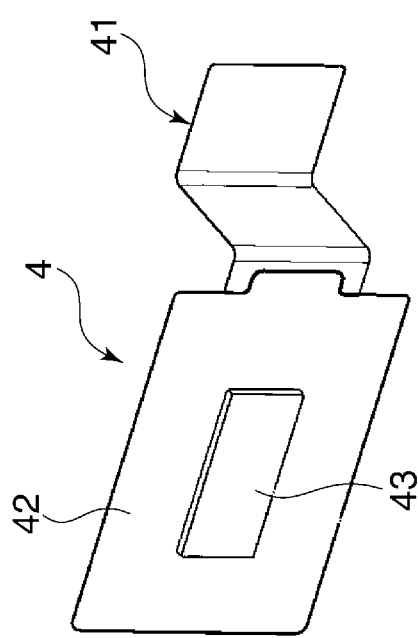
FIGS. 9A and 9B are perspective views showing a construction of a thermally-conductive sheet unit mounted on an image pickup device plate unit appearing in FIG. 7.
Figure 9A:
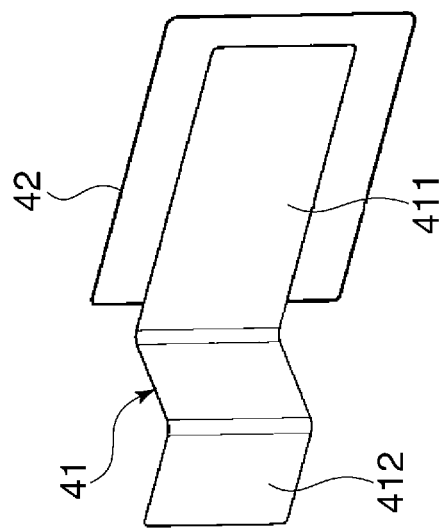

A description will now be given of how a thermally-conductive sheet is mounted on the image pickup device plate unit as a measure against heat generation of the image pickup device 10. FIGS. 9A and 9B are perspective views showing a construction of the thermally-conductive sheet unit 4 mounted on the image pickup device plate unit appearing in FIG. 7, in which FIG. 9A is a rear perspective view, and FIG. 9B is a front perspective view.

The thermally-conductive sheet unit 4 has a thermally-conductive sheet 41 that transfers heat of the image pickup device 10 to the outside, a sheeted holder 42 that holds the thermally-conductive sheet 41, and a cushion 34 held by the sheeted holder 42. The thermally-conductive sheet 41 is comprised of a heat absorbing portion 411, which is disposed on the image pickup device 10 side, and a heat dissipating portion 412, which dissipates heat transferred from the heat absorbing portion 411. A flexible graphite sheet, for example, may be used as the thermally-conductive sheet 41, but the thermally-conductive sheet 41 is not limited to this. The cushion 43 and the heat absorbing portion 411 of the thermally-conductive sheet 41 are disposed on a front side and a rear side, respectively, of the sheeted holder 42 and held by adhesives.

Figure 10:
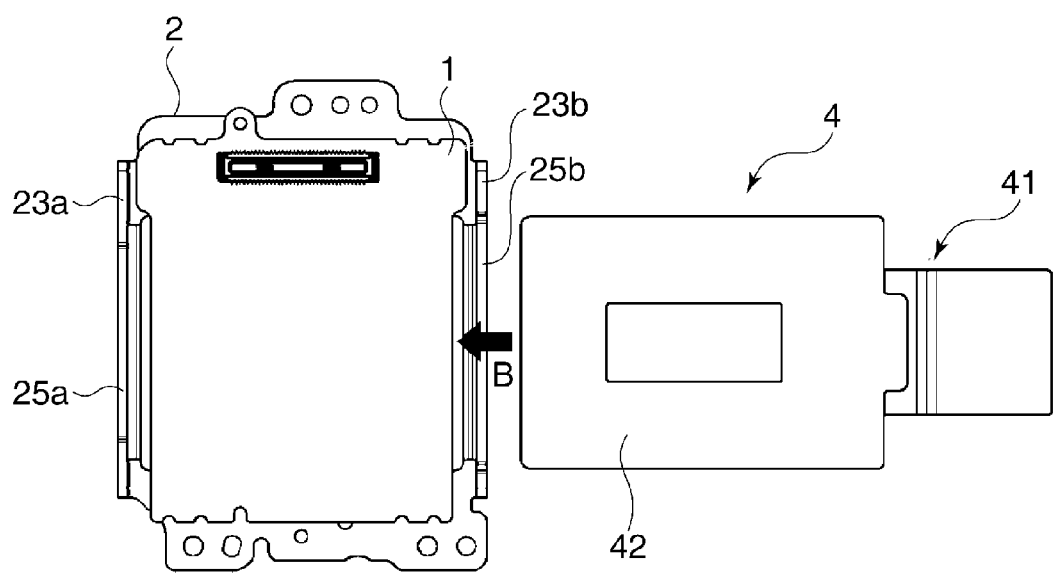
FIG. 10 is a side view showing how the thermally-conductive sheet unit is mounted on the image pickup device plate.

FIG. 10 is a view showing how the thermally-conductive sheet unit 4 is mounted on the image pickup device plate unit. The thermally-conductive sheet unit 4 is inserted into the image pickup device plate unit in a direction indicated by an arrow B in FIG. 10. First, the sheeted holder 42 is inserted so as to pass through the concave portion 25b provided in the wall portion 23b of the plate 2. After passing through the concave portion 25b, the sheeted holder 42 enters into the gap portion 12 appearing in FIG. 1B. At this time, the position of the sheeted holder 42 in a direction parallel to short sides of the sheeted holder 42 is determined by side wall surfaces of the concave portion 25b and long-side side surfaces of the sheeted holder 42. Here, the wall portion 23b of the plate 2 acts as a second wall portion.

Figure 11:
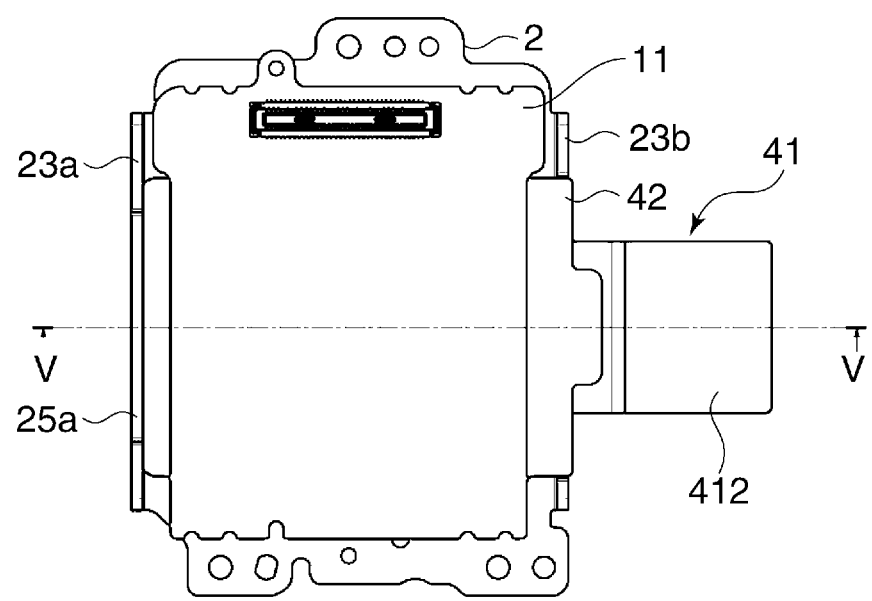
FIG. 11 is a rear view showing a state in which the thermally-conductive sheet unit is incorporated in the image pickup device plate.

FIG. 11 is a rear view showing a state in which the thermally-conductive sheet unit 4 is incorporated in the image pickup device plate unit. As the sheeted holder 42 passes through the gap portion 12, it comes into abutment with the convex portion 25a formed in the wall portion 23a. Here, the wall portion 23a of the plate 2 acts as a first wall portion.

Because the position of the thermally-conductive sheet unit 4 in the mounting direction (the direction indicated by the arrow B in FIG. 10) is thus determined, the thermally-conductive sheet unit 4 can be positioned with respect to the image pickup device plate unit, and the heat absorbing portion 411 can be placed at substantial a central position of the rear surface of the image pickup device 10. As a result, a heat generation area of the image pickup device 10 can be reliably covered with the heat absorbing portion 411 to dissipate heat from the image pickup device 10 reliably and uniformly.

FIG. 12 is a cross-sectional view taken in the direction of an arrow V-V in FIG. 11. The concave portion 25b is set in such a range as not to interfere with the gap portion 12, and the convex portion 25a is set in such a range as to cover the gap portion 12. In the gap portion 12, the cushion 43 is charged in the substrate 11, and the heat absorbing portion 411 is pressed against the image pickup device unit 1 (the image pickup device 10) via the sheeted holder 42. As a result, the thermally-conductive sheet 41 can be stably in contact with the image pickup device unit 1 to absorb heat from the image pickup device 10. The heat absorbed from the image pickup device unit 1 by the heat absorbing portion 411 is transmitted to the heat dissipating portion 412, which in turn dissipates the heat to a dissipation component, not shown, so that the temperature of the image pickup device 10 can be prevented from increasing.

As described above, because the convex portion 25a and the concave portion 25b are provided in the wall portions 23a and 23b of the plate 2, the thermally-conductive sheet unit 4 can be easily positioned with respect to the image pickup device plate unit, and heat can be reliably and uniformly dissipated from the image pickup device unit 1. Moreover, because the thermally-conductive sheet unit 4 can easily enter into the gap portion 12 of the image pickup device unit 1, the ease with which the thermally-conductive sheet unit 4 is mounted on the image pickup device unit 1 can be enhanced. These effects can be obtained at the same time when the effects of downsizing the image pickup device plate unit and realizing high strength and resistance to shock are obtained.

Although in the embodiment described above, the image pickup device unit 1 is bonded and fixed to the plate 2 fixed to the image pickup apparatus main body, the image pickup apparatus main body may be provided with a portion having an equivalent shape, and the image pickup device unit 1 may be bonded and fixed to this portion having the equivalent shape.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-102873 filed Apr. 27, 2012, which is hereby incorporated by reference herein in its entirety.

What is claimed is:

1. An image pickup apparatus comprising:
   an image pickup device;
   a wiring substrate configured to have the image pickup device mounted thereon;
   a fixing member configured to be fixed on the image pickup device; and
   an adhesive provided between the image pickup device and the fixing member,
   wherein the image pickup device includes an abutment portion provided on a light-incident surface of the image pickup device,
   wherein the fixing member includes an opening portion and a first wall portion facing a side surface of the image pickup device,
   wherein the image pickup device is mounted on the wiring substrate with an opposed surface of the light-incident surface of the image pickup device mounted on the wiring substrate and the side surface of the image pickup device protrudes outwardly from a side surface of the wiring substrate,
   wherein the fixing member is fixed on the image pickup device so that the light-incident surface, except for the abutment portion, of the image pickup device is exposed from the opening portion of the fixing member and the abutment portion abuts the fixing member,
   wherein the fixing member is fixed on the image pickup device so that a space is provided between the side surface of the image pickup device and the first wall portion of the fixing member, and
   wherein the adhesive is provided in the space.

2. An image pickup apparatus according to claim 1, wherein the wiring substrate is arranged so that a distance from the first wall portion to the side surface of the wiring substrate, which is opposed to the first wall portion, is greater than a distance from the first wall portion to the side surface of the image pickup device.

3. An image pickup apparatus according to claim 1, further comprising:
   a thermally-conductive sheet,
   wherein a gap portion exists between the image pickup device and the wiring substrate,
   wherein the fixing member further includes a second wall portion,
   wherein the first and second wall portions face each other across the opening portion,
   wherein one of the first or second wall portion has a convex portion,
   wherein the other of the first or second wall portion has a concave portion, and
   wherein the thermally-conductive sheet is disposed in the gap portion and abuts the convex portion.

4. An image pickup apparatus according to claim 1, wherein:
   the image pickup device includes a lead soldered to the wiring substrate, and
   the adhesive is provided in a space between a side surface on which the lead of the image pickup device is not arranged and the first wall portion.

5. An image pickup apparatus according to claim 1, wherein the abutment portion abuts on an area between the opening and the first wall portion of the fixing member.

* * * * *